US010684615B2

(12) United States Patent
Maenishi

(10) Patent No.: US 10,684,615 B2
(45) **Date of Patent: *Jun. 16, 2020**

(54) PRODUCTION ACTIVITY SUPPORT SYSTEM

(71) Applicant: Panasonic Intellectual Property Management Co., Ltd., Osaka (JP)

(72) Inventor: Yasuhiro Maenishi, Yamanashi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 512 days.

This patent is subject to a terminal disclaimer.

(21) Appl. No.: 15/179,979

(22) Filed: Jun. 11, 2016

(65) Prior Publication Data

US 2017/0068239 A1 Mar. 9, 2017

(30) Foreign Application Priority Data

Jul. 1, 2015 (JP) ................................ 2015-132283
Jul. 1, 2015 (JP) ................................ 2015-132284

(51) Int. Cl.
*G06Q 10/06* (2012.01)
*G05B 19/418* (2006.01)

(52) U.S. Cl.
CPC ... *G05B 19/4188* (2013.01); *G06Q 10/06312* (2013.01); *G05B 2219/31053* (2013.01); *G06Q 10/063112* (2013.01); *Y02P 90/86* (2015.11)

(58) Field of Classification Search
CPC ..... G06Q 10/06312; G06Q 10/063112; G05B 19/4188; G05B 2219/31053; G05B 19/41865; Y02P 90/86; H05K 13/08
USPC ............................................... 705/7.14, 7.22
See application file for complete search history.

(56) References Cited

U.S. PATENT DOCUMENTS 5,216,612 A * 6/1993 Cornett .............. G05B 19/4184 700/96
5,428,547 A 6/1995 Ikeda
6,408,258 B1 * 6/2002 Richer ...................... B64F 5/60 702/182

(Continued)

FOREIGN PATENT DOCUMENTS

JP H04-260971 A 9/1992
JP H05-019829 A 1/1993

(Continued)

*Primary Examiner* — Nadja N Chong Cruz
(74) *Attorney, Agent, or Firm* — Pearne & Gordon LLP

(57) ABSTRACT

A production activity support system for supporting production activity in a component mounting system, comprises: a production information acquirer obtaining production information including a production plan of a production operation executed in the component mounting system and production performance information; a storage storing maintenance relevant information regarding execution history information indicating a history of the maintenance work executed on each of the maintenance targets; a maintenance work plan creation unit creating a work plan of the maintenance work executed on at the maintenance targets; and a display displaying a notification that the maintenance work indicated by the work plan created by the maintenance work plan creation unit is executed at the set maintenance execution date and time along with the production plan.

11 Claims, 17 Drawing Sheets

PRIORITY TABLE INFORMATION (35)

| | MAINTENANCE PORTION (35a) | WORK CLASSIFICATION (35b) | RECOMMENDED MAINTENANCE DEADLINE (USE LIMIT TIME OR USE LIMIT COUNT) (36) | MAINTENANCE PRIORITY (37) A (37a) | B (37b) | C (37c) |
|---|---|---|---|---|---|---|
| 38 | DEVICE MAIN PORTION | | | | | |
| 38a | NOZZLE HOLDER | CLEANING | 140H | 140H~100H | 100H~40H | 40 H OR LESS |
| 38b | NOZZLE HOLDER | OILING | 560H | 560H~400H | 400H~160H | 160 H OR LESS |
| 38c | NOZZLE HOLDER | INSPECTING | 18000H | 18000H ~12600H | 12600H ~5400H | 5400 H OR LESS |
| 38d | NOZZLE | CLEANING | 560H | 560H~400H | 400H~160H | 160 H OR LESS |
| 38e | NOZZLE | INSPECTING | 3000H | 3000H ~2700H | 2700H ~900H | 900 H OR LESS |
| 38f | NOZZLE | INSPECTING | 700000 COUNTS | 700000 COUNTS TO 490000 COUNTS | 490000 COUNTS TO 210000 COUNTS | 210000 COUNTS OR LESS |
| 38g | NOZZLE CHANGER | CLEANING | 560H | 560H~400H | 400H~160H | 160 H OR LESS |
| 38h | CONVEYOR | OILING | 560H | 560H~400H | 400H~160H | 160 H OR LESS |
| 38i | CONVEYOR | INSPECTING | 560H | 560H~400H | 400H~160H | 160 H OR LESS |
| 38j | POWER SUPPLY | CLEANING | 3000H | 3000H ~2700H | 2700H ~900H | 900 H OR LESS |
| | ⋮ | | | | | |
| 39 | TAPE FEEDER | | | | | |
| 39a | TAPER TRANSFER PATH | CLEANING | 350H | 350H~245H | 245H~105H | 105 H OR LESS |
| | · | | | | | |

(56) References Cited

U.S. PATENT DOCUMENTS

| | | | | |
|---|---|---|---|---|
| 6,738,748 | B2 * | 5/2004 | Wetzer .................. | G06Q 10/06 705/7.14 |
| 7,082,383 | B2 * | 7/2006 | Baust .................... | G06Q 10/00 702/184 |
| 2007/0168163 | A1 * | 7/2007 | Kobayashi ........... | G05B 19/042 702/188 |
| 2008/0147232 | A1 | 6/2008 | Kuribayashi et al. | |

FOREIGN PATENT DOCUMENTS

| | | | |
|---|---|---|---|
| JP | 2003-124698 | A | 4/2003 |
| JP | 2006-108322 | A | 4/2006 |
| JP | 2008-108919 | A | 5/2008 |
| JP | 4478108 | B | 6/2010 |
| JP | 2011-253393 | A | 12/2011 |
| WO | 2004/086841 | A1 | 10/2004 |

* cited by examiner

1 COMPONENT MOUNTING SYSTEM
2 COMMUNICATION NETWORK
4 COMPONENT MOUNTING LINE

12a CONVEYOR
15 TAPE FEEDER
17 COMPONENT MOUNTING MECHANISM
19 MOUNT HEAD
19a NOZZLE HOLDER
20 NOZZLE
M4, M5 COMPONENT MOUNTING DEVICES

MAINTENANCE TARGET 33a 33b 33c 33d 33e

| LINE NO | UNIT ID | FACILITY ID | MAINTENANCE PORTION | WORK CLASSIFICATION |
|---|---|---|---|---|
| L1 | NOZZLE HEAD 1 | 1R | NOZZLE HOLDER | CLEANING |
| L1 | NOZZLE HEAD 1 | 1R | NOZZLE HOLDER | OILING |
| L1 | NOZZLE HEAD 2 | 1R | NOZZLE | CLEANING |
| L1 | NOZZLE HEAD 2 | 1R | NOZZLE | INSPECTING |
| L1 | NOZZLE HEAD 2 | 1R | NOZZLE HOLDER | CLEANING |
| . . . | . . . | . . . | . . . | . . . |
| L1 | DEVICE M5 | M5 | POWER SUPPLY | INSPECTING |
| L1 | DEVICE M5 | M5 | CONVEYOR | INSPECTING |
| . . . | . . . | . . . | . . . | . . . |

FACILITY POSITION INFORMATION

MAINTENANCE WORK CONTENT 34

34a 34b 34c 34d

| MAINTENANCE PORTION | WORK CLASSIFICATION | WORK TIME (min) | WORK CONTENT |
|---|---|---|---|
| DEVICE MAIN MEMBER | | | |
| NOZZLE HOLDER | CLEANING | 40 | SEPARATE NOZZLE HOLDER AND CLEAN INSIDE |
| NOZZLE HOLDER | OILING | 20 | SUPPLYING OIL TO CLAMP CLAW OF NOZZLE HOLDER |
| NOZZLE HOLDER | INSPECTING | 20 | CHECK WHETHER OR NOT DAMAGE OR ABRASION OCCURS |
| NOZZLE | CLEANING | 20 | CLEAN RECOGNITION CORD OF NOZZLE ATTACHED TO NOZZLE CHANGER OR NOZZLE HEAD, FRONT END, NOZZLE REFLECTION PLATE, AND INSIDE OF NOZZLE |
| NOZZLE | INSPECTING | 1 | CHECK WHETHER OR NOT ABRASION OF CLAMP GROOVE OCCURS |
| CONVEYOR | REFUELING | 30 | REFUEL GREASE TO MOVER OF CONVEYOR |
| CONVEYOR | INSPECTING | 10 | CHECK STATE OF BELT AND BELT TENSION |
| POWER SUPPLY | CLEANING | 20 | CLEAN FILTER ATTACHED TO POWER SUPPLY |
| ⋮ | | | |
| TAPE FEEDER | | | |
| TAPE TRANSFER PATH | CLEANING | 10 | REMOVE CONTAMINATION AND TRASH OF TAPE TRANSFER PATH |
| ⋮ | | | |

FIG. 6

PRIORITY TABLE INFORMATION (35)

| | MAINTENANCE PORTION (35a) | WORK CLASSIFICATION (35b) | RECOMMENDED MAINTENANCE DEADLINE (USE LIMIT TIME OR USE LIMIT COUNT) (36) | MAINTENANCE PRIORITY (37) | | |
|---|---|---|---|---|---|---|
| | | | | A (37a) | B (37b) | C (37c) |
| 38 | DEVICE MAIN PORTION | | | | | |
| 38a | NOZZLE HOLDER | CLEANING | 140H | 140H~100H | 100H~40H | 40 H OR LESS |
| 38b | NOZZLE HOLDER | OILING | 560H | 560H~400H | 400H~160H | 160 H OR LESS |
| 38c | NOZZLE HOLDER | INSPECTING | 18000H | 18000H ~12600H | 12600H ~5400H | 5400 H OR LESS |
| 38d | NOZZLE | CLEANING | 560H | 560H~400H | 400H~160H | 160 H OR LESS |
| 38e | NOZZLE | INSPECTING | 3000H | 3000H ~2700H | 2700H ~900H | 900 H OR LESS |
| 38f | NOZZLE | INSPECTING | 700000 COUNTS | 700000 COUNTS TO 490000 COUNTS | 490000 COUNTS TO 210000 COUNTS | 210000 COUNTS OR LESS |
| 38g | NOZZLE CHANGER | CLEANING | 560H | 560H~400H | 400H~160H | 160 H OR LESS |
| 38h | CONVEYOR | OILING | 560H | 560H~400H | 400H~160H | 160 H OR LESS |
| 38i | CONVEYOR | INSPECTING | 560H | 560H~400H | 400H~160H | 160 H OR LESS |
| 38j | POWER SUPPLY | CLEANING | 3000H | 3000H ~2700H | 2700H ~900H | 900 H OR LESS |
| | ⋮ | | | | | |
| 39 | TAPE FEEDER | | | | | |
| 39a | TAPER TRANSFER PATH | CLEANING | 350H | 350H~245H | 245H~105H | 105 H OR LESS |
| | · | | | | | |

FIG. 7

MAINTENANCE PRIORITY SCHEDULE DATA 44

33 · a1 · a2 · a3 · 44a · a6 · a7

| | MAINTENANCE TARGET | | | | | CHANGE OF MAINTENANCE PRIORITY WITH DATE AND TIME | | | | | |
|---|---|---|---|---|---|---|---|---|---|---|---|
| | LINE NO | UNIT ID | FACILITY ID | MAINTENANCE PORTION | WORK CLASSIFICATION | 20** **/*1 | 20** **/*2 | 20** **/*3 | ... | 20** **/*6 | 20** **/*7 |
| 46a | L1 | NOZZLE HEAD 1 | 1R | NOZZLE HOLDER | CLEANING | A | A | | ... | | |
| 46b | L1 | NOZZLE HEAD 1 | 1R | NOZZLE HOLDER | OILING | B | B | B | ... | A | A |
| 46c | L1 | NOZZLE HEAD 2 | 1R | NOZZLE | CLEANING | B | B | B | ... | A | A |
| 46d | L1 | NOZZLE HEAD 2 | 1R | NOZZLE | INSPECTING | C | C | C | ... | B | B |
| 46e | L1 | NOZZLE HEAD 2 | 1R | NOZZLE HOLDER | CLEANING | C | C | B | ... | B | B |
| | ... | ... | ... | ... | ... | ... | ... | ... | ... | ... | ... |
| 46f | L1 | DEVICE M5 | M5 | POWER SUPPLY | INSPECTING | A | A | | ... | | |
| 46g | L1 | DEVICE M5 | M5 | CONVEYOR | INSPECTING | B | A | A | ... | | |
| | ... | ... | ... | ... | ... | ... | ... | ... | ... | ... | ... |

FACILITY POSITION INFORMATION 32

MAINTENANCE CONDITION DATA 43a 43b

Figures 8A, 8B:
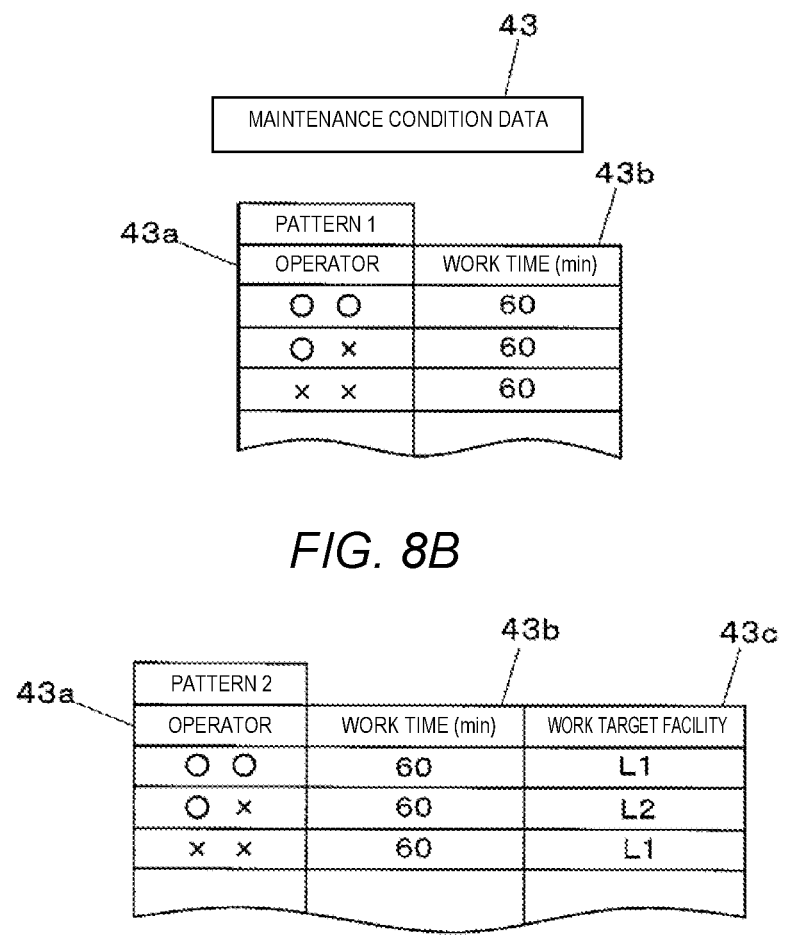

| PATTERN 1 | |
|---|---|
| OPERATOR | WORK TIME (min) |
| ○ ○ | 60 |
| ○ × | 60 |
| × × | 60 |
| | |

FIG. 8B 43a 43b 43c

| PATTERN 2 | | |
|---|---|---|
| OPERATOR | WORK TIME (min) | WORK TARGET FACILITY |
| ○ ○ | 60 | L1 |
| ○ × | 60 | L2 |
| × × | 60 | L1 |
| | | |

MAINTENANCE WORK PLAN TABLE

45(1) GROUP 1

33 45a

| | LINE NO | UNIT ID | FACILITY ID | MAINTENANCE PORTION | WORK CLASSIFICATION | WORK TIME (min) |
|---|---|---|---|---|---|---|
| 46a | L1 | NOZZLE HEAD 1 | 1R | NOZZLE HOLDER | CLEANING | 40 |
| 46f | L1 | DEVICE M5 | M5 | POWER SUPPLY | CLEANING | 20 |
| a2 | MAINTENANCE EXECUTION DATE AND TIME 20**/**/*2 | | | MAINTENANCE WORK TIME | | 60 |

45b

45(2) GROUP 2

33 45a

| | LINE NO | UNIT ID | FACILITY ID | MAINTENANCE PORTION | WORK CLASSIFICATION | WORK TIME (min) |
|---|---|---|---|---|---|---|
| 46g | L1 | DEVICE M5 | M5 | CONVEYOR | INSPECTING | 10 |
| 46b | L1 | NOZZLE HEAD 1 | 1R | NOZZLE HOLDER | OILING | 20 |
| 46c | L1 | NOZZLE HEAD 2 | 1R | NOZZLE | CLEANING | 20 |
| a3 | MAINTENANCE EXECUTION DATE AND TIME 20**/**/*3 | | | MAINTENANCE WORK TIME | | 60 |

45b

45(3) GROUP 3

33 45a

| | LINE NO | UNIT ID | FACILITY ID | MAINTENANCE PORTION | WORK CLASSIFICATION | WORK TIME (min) |
|---|---|---|---|---|---|---|
| 46e | L1 | NOZZLE HEAD 2 | 1R | NOZZLE HOLDER | CLEANING | 40 |
| a3 | MAINTENANCE EXECUTION DATE AND TIME 20**/**/*3 | | | MAINTENANCE WORK TIME | | 40 |

45b

PRODUCTION ACTIVITY SUPPORT SYSTEM

BACKGROUND OF THE INVENTION

1. Field of the Invention

The present invention relates to a maintenance work support system that supports a maintenance work in a component mounting system.

2. Description of the Related Art

A component mounting system that mounts electronic components on boards to produce mounting boards, includes component mounting lines. In such lines, a plurality of facilities such as a printing apparatus printing solder on boards, and a component mounting device mounting components on the boards after printing solder, are connected. In the past, there has been demand for the enhancement of component mounting accuracy and the improvement of productivity in the component mounting industry, and it is important to execute a maintenance work for constantly maintaining the states of component mounting facilities in a favorable state in order to meet these needs. In order to execute the maintenance work with good efficiency according to a plan, an operation support system having a function of drafting a maintenance work plan has been known (see, for example, Japanese Patent No. 4478108). In the related art described in Japanese Patent No. 4478108, the operation plan of the maintenance work is created such that various plans such as a plan for each component mounting device, a plan for each component mounting device group, and a plan for each maintenance staff are created depending on utilization purpose of the plan.

CITATION LIST

Patent Literature

PTL 1: Japanese Patent No. 4478108

SUMMARY OF THE INVENTION

According to the present disclosure, a production activity support system for supporting production activity including maintenance works executed on maintenance targets in a component mounting system including at least one component mounting device, comprises: a production information acquirer obtaining production information including a production plan of a production operation executed in the component mounting system; a storage storing maintenance relevant information regarding one or more maintenance works executed on each of the maintenance targets, the maintenance relevant information including a recommended maintenance deadline indicating a deadline by which execution of the maintenance work is necessary and execution history information indicating a history of the maintenance work executed on each of the maintenance targets; a maintenance work plan creation unit creating a work plan of the maintenance work executed on at least one of the maintenance targets; a setting unit setting prearranged maintenance execution date and time when the maintenance work is executed; and a display displaying a notification that the maintenance work indicated by the work plan created by the maintenance work plan creation unit is executed at the set maintenance execution date and time along with the production plan.

According to the present disclosure, it is possible to efficiently execute a maintenance work in a component mounting system from mid- and long-term points of view.

BRIEF DESCRIPTION OF DRAWINGS

FIG. 4 is an explanatory diagram of a maintenance target in the production activity support system of the exemplary embodiment of the present invention;

FIG. 5 is an explanatory diagram of maintenance work content in the production activity support system of the exemplary embodiment of the present invention;

FIG. 6 is an explanatory diagram of priority table information in the production activity support system of the exemplary embodiment of the present invention;

FIG. 7 is an explanatory diagram of maintenance priority schedule data in the production activity support system of the exemplary embodiment of the present invention;

FIG. 8A and FIG. 8B are explanatory diagrams of maintenance condition data in the production activity support system of the exemplary embodiment of the present invention;

FIG. 9 is an explanatory diagram of a maintenance work plan table in the production activity support system of the exemplary embodiment of the present invention;

DETAILED DESCRIPTION OF THE PREFERRED EMBODIMENT

Prior to the description of an exemplary embodiment of the present invention, the problems in the apparatus of the related art will be briefly described. A component mounting system includes a plurality of component mounting lines. The number of facilities as maintenance work targets is increased, and the kind of units used in these facilities has diversified. In order to more efficiently execute a maintenance work with such a component mounting system as a target, it is necessary to draft medium- and long-term maintenance work plans obtained by predicting a time by which the maintenance is necessary to be executed on each facility or each unit in a sequence of time. However, in the related art described in Japanese Patent No. 4478108, in a case where a maintenance execution time exceeds an execution recommendation time of the maintenance work, a maintenance work plan of the maintenance works is collectively created. Thus, there are limitations on items as the maintenance targets requiring the maintenance at a point of time when the maintenance work plan is drafted, and it is difficult to execute an efficient maintenance work from medium- and long-term points of view.

An object of the present disclosure is to provide a production activity support system capable of executing an efficient maintenance work in a component mounting system from medium- and long-term points of view.

Figure 1:
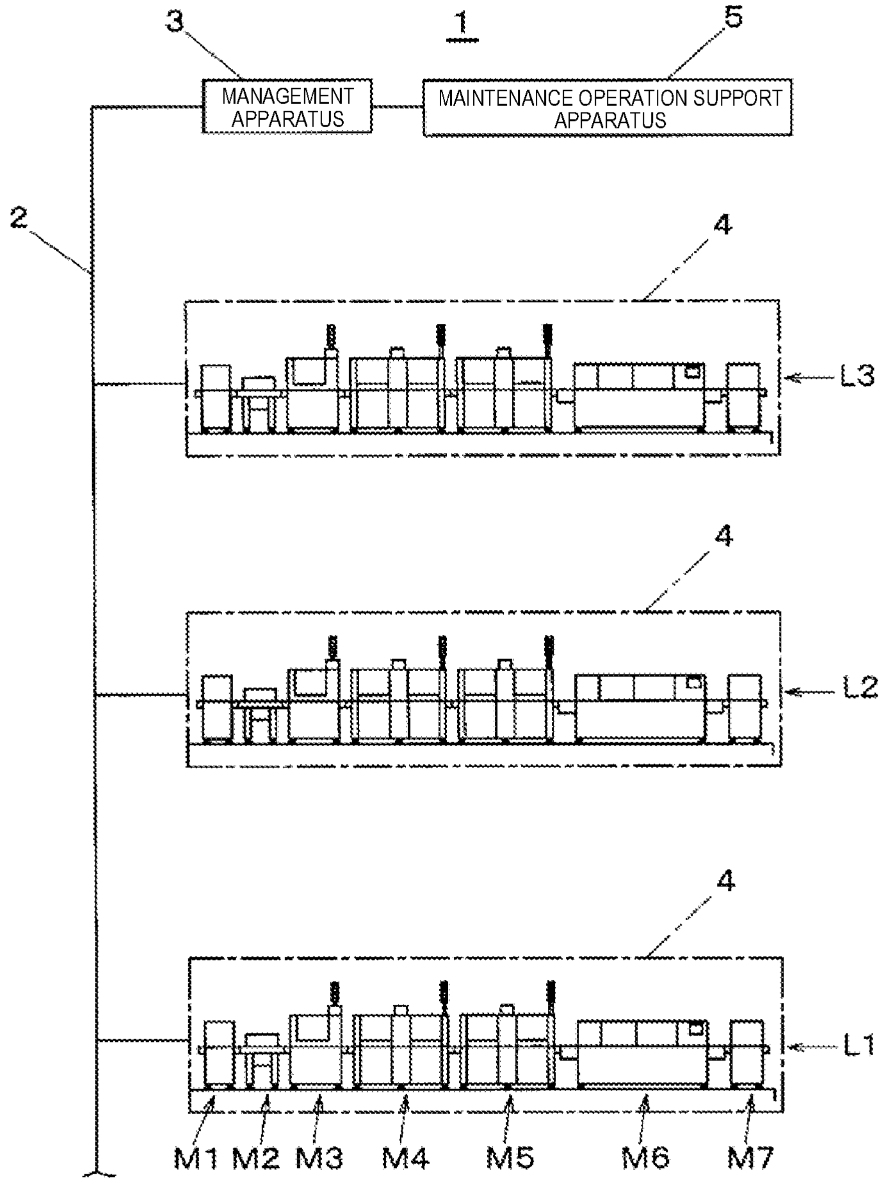
FIG. 1 is a configuration explanatory diagram of a component mounting system of an exemplary embodiment of the present invention.

An exemplary embodiment of the present invention will be described with reference to the drawings. The configuration of component mounting system 1 to which a maintenance work support system of the present exemplary embodiment applies, will be described with reference to FIG. 1. Component mounting system 1 has a function of mounting electronic components on a board to produce mounting boards. In the present exemplary embodiment, a plurality (here, lines L1 to L3) of component mounting lines 4 are connected to management apparatus 3 via communication network 2. The operations in the respective component mounting lines 4 are managed by management apparatus 3. That is, data items required for operating the respective facilities belonging to component mounting lines 4 are transmitted to the corresponding facilities by management apparatus 3, and the processing results in the respective facilities are transmitted to management apparatus 3.

Maintenance work support apparatus 5 is ancillary to management apparatus 3 of the present exemplary embodiment. Maintenance work support apparatus 5 has a function of supporting a maintenance work executed on a maintenance target in component mounting system 1, and functions as a production activity support system, which supports production activities including the maintenance work.

Each of component mounting lines 4 is configured such that board supply device M1, board delivery device M2, solder printing device M3, component mounting devices M4 and M5, reflowing device M6, and board collecting device M7 are connected in series. Boards 13 (see FIG. 2) supplied by board supply device M1 are loaded into solder printing device M3 through board delivery device M2, and a solder printing operation of screen-printing component bonding solder on boards 13 is executed in the solder printing device.

Boards 13 on which the solder has been printed are sequentially delivered to component mounting devices M4 and M5, and a component mounting operation of mounting electronic components on boards 13 on which the solder has been printed in the component mounting devices is performed. Boards 13 on which the components have been mounted are loaded into reflowing device M6, and the component bonding solder is melted and solidified by being heated according to a predetermined heating profile in the reflowing device. Thus, the electronic components are bonded onto boards 13 through the soldering, and thus, the mounting boards obtained by mounting the electronic components on boards 13 are completed and are collected in board collecting device M7.

Figure 2:
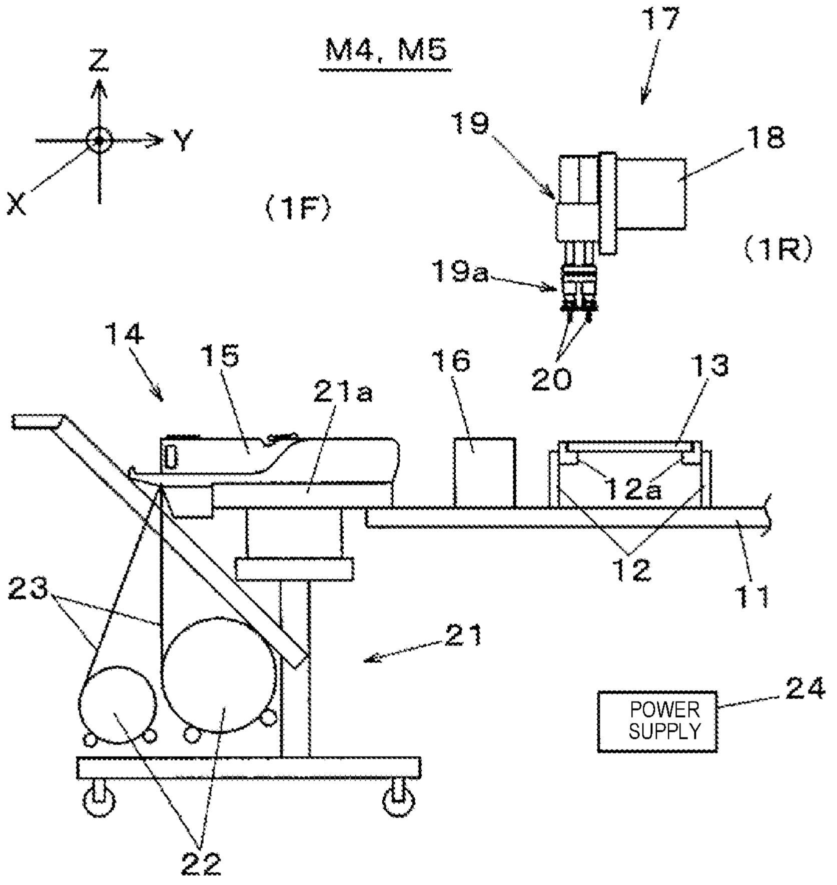
FIG. 2 is a partial sectional view of a component mounting device included in the component mounting system of the exemplary embodiment of the present invention.

Hereinafter, the configuration and function of component mounting device M4 or M5 will be described with reference to FIG. 2. In FIG. 2 showing the section of main parts of component mounting device M4 or M5, board transfer mechanism 12 is provided on base 11 in a board transfer direction (an X direction, a vertical direction to a paper surface in this drawing). Board transfer mechanism 12 includes conveyor 12*a* that transfers board 13, and holds board 13 loaded from solder printing device M3 by positioning the board in a mounting operation position by component mounting mechanisms 17.

Component mounting mechanisms 17 are arranged on both sides (a front side (1F) and a rear side (1R) in an operation direction) of board transfer mechanism 12. The component mounting mechanism horizontally moves mount head 19 (nozzle head) in an X direction and a Y direction by head moving mechanism 18. Nozzle holder 19*a* is provided at a lower end of mount head 19. The electronic component is picked up from tape feeder 15 by nozzle 20 attached to nozzle holder 19*a*, and is sent to and is mounted on board 13.

Component supply 14 is disposed on a lateral side of board transfer mechanism 12 in the Y direction (a direction perpendicular to the X direction). Carriage 21 in which tape feeders 15 are previously attached to a plurality of feeder attaching slots (not shown) formed in feeder base 21*a* is set to component supply 14. Tape reels 22 that accommodate carrier tapes 23 holding the electronic components in a winding state, are held by carriage 21. Carrier tapes 23 led out of tape reels 22 are pitch-fed to a component pick-up position of nozzle 20 by tape feeder 15.

Component recognizing camera 16 is disposed between component supply 14 and board 13. Mount head 19 that has picked up the electronic component from tape feeder 15 by nozzle 20 moves above component recognizing camera 16, and thus, the electronic component sucked onto and held by nozzle 20 is captured by component recognizing camera 16. Each of component mounting devices M4 and M5 includes power supply 24, and power supply 24 supplies operating power to a driver or a controller within the corresponding device.

Component mounting devices M4 and M5 above-described, conveyor 12*a* of the board transfer mechanism, nozzle holder 19*a* of mount head 19 and nozzle 20 attached to nozzle holder 19*a* constituting component mounting mechanism 17, and power supply 24 are maintenance targets on which a maintenance work such as inspecting or cleaning is regularly executed. In component mounting system 1 illustrated in the present exemplary embodiment, the maintenance works executed on these maintenance targets are efficiently managed by an operation support function of maintenance work support apparatus 5 described above.

Reference numerals (L1, L2 and L3) specifying component mounting lines 4, reference numerals (M4 and M5) specifying component mounting devices M4 and M5, reference numeral (1F) or (1R) specifying component mounting mechanism 17, reference numeral specifying mount head 19 as a nozzle head, and reference numerals specifying the respective units are used as identification numerals for specifying the above-described maintenance targets when the maintenance targets serve as the operation support targets by maintenance work support apparatus 5.

Figure 3:
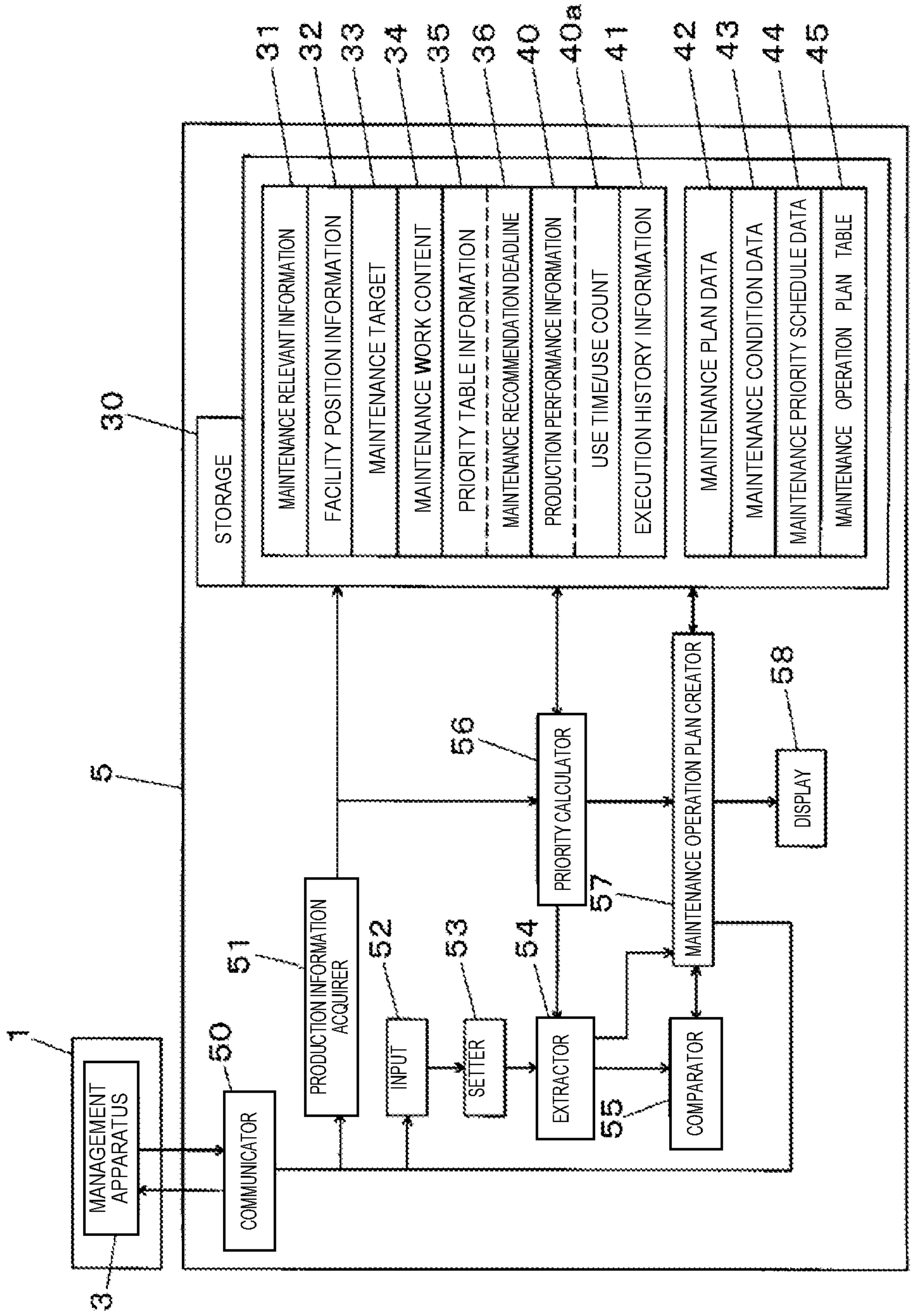
FIG. 3 is a block diagram showing the configuration of a production activity support system of the exemplary embodiment of the present invention.

Hereinafter, the configuration of a control system of maintenance work support apparatus 5 will be described with reference to FIG. 3. In FIG. 3, maintenance work support apparatus 5 is connected to management apparatus 3 of component mounting system 1 through communicator 50, and various signals or data items are transmitted and received between management apparatus 3 and the respective units of maintenance work support apparatus 5. In the configuration shown in herein, maintenance work support apparatus 5 is described as an apparatus independent from management apparatus 3, but the function of maintenance work support apparatus 5 may be a part of a processing function of management apparatus 3. Management apparatus 3 can transmit and receive information to and from a system, for example, ERP (Enterprise Resource Planning), which integrates the entire production factory.

Maintenance work support apparatus 5 includes production information acquirer 51, input 52, setting unit 53, extractor 54, comparator 55, priority calculator 56, maintenance work plan creation unit 57, and display 58 in addition to storage 30 that stores various information and data items. The functions of the respective units constituting maintenance work support apparatus 5 will be sequentially described in conjunction with the contents of various information items stored in storage 30.

First, the information and data stored in storage 30 will be described. Storage 30 stores maintenance relevant information 31 and maintenance plan data 42. Maintenance relevant information 31 is information relevant to one or more maintenance works executed on each of the maintenance targets. Maintenance relevant information 31 includes facility position information 32, maintenance target 33, maintenance work content 34, priority table information 35, production performance information 40 and execution history information 41 to be described below.

Facility position information 32 and maintenance target 33 will be described with reference to FIG. 4. As shown in FIG. 4, maintenance target 33 includes "line NO" 33*a*, "unit ID" 33*b*, "facility ID" 33*c*, "maintenance portion" 33*d*, and "work classification" 33*e*. "Line NO" 33*a* is a number specifying component mounting line 4 shown in FIG. 1. "Line NO" 33*a* is designated, and thus, component mounting line 4 as a maintenance target is specified in component mounting system 1. "Unit ID" 33*b* is an item that comprehensively specifies a range of the maintenance work target. Here, as the comprehensive range in a case where mount head 19 serves as the operation target in the configuration shown in FIG. 2, a comprehensive range, such as a comprehensive range per mechanism unit basis such as "nozzle head" 1 or "nozzle head" 2, or a comprehensive range per individual device basis such as "device" M5, is used. Those comprehensive ranges are appropriately set as necessary.

"Facility ID" 33*c* is an identification numeral for specifying the maintenance target per facility basis, and is appropriately set in association with "unit ID" 33*b*. Here, "nozzle head" 1 and "nozzle head" 2 as "unit ID" 33*b* represent that these heads are arranged on the rear side (1R) shown in FIG. 2, and "M5" represents that the entire component mounting device M5 is comprehensively the maintenance work target. "Line NO" 33*a*, "unit ID" 33*b* and "facility ID" 33*c* constitute facility position information 32 specifying the facility as the maintenance work target in component mounting system 1.

"Maintenance portion" 33*d* indicates a portion as a target on which the maintenance work is specifically executed. "Work classification" 33*e* indicates a work to be specifically executed with "maintenance portion" 33*d* as the target. "Maintenance portion" 33*d* is represented in maintenance work content 34 in detail. "Unit ID" 33*b* and "facility ID" 33*c* are classified for the sake of convenience, and may be appropriately selected for the sake of convenience in the management of the maintenance work.

FIG. 5 shows maintenance work content 34. Here, "work classification" 34*b*, "work time" 34*c* and "work content" 34*d* are defined for each "maintenance portion" 34*a*. "Maintenance portion" 34*a* corresponds to "maintenance portion" 33*d* of maintenance target 33. "Work classification" 34*b* indicates the work classification such as cleaning, supplying lubricating oil (oiling), or inspecting which is the classification of the maintenance work executed on each item indicated in "maintenance portion" 34*a*. "Work time" 34*c* expresses a standard necessary time required to execute the work item in minutes. "Work content" 34*d* indicates the detailed execution content of the work item. It is possible to understand the work classification or detailed work execution content of the maintenance work, and the work load as the work time, by referring to maintenance target 33 and maintenance work content 34.

Hereinafter, priority table information 35 will be described with reference to FIG. 6. In FIG. 6, "maintenance portion" 35*a* and "work classification" 35*b* correspond to "maintenance portion" 33*d* and "work classification" 33*e* in maintenance target 33. Here, "nozzle holders" 38*a* to 38*c*, "nozzles" 38*d* to 38*f*, "nozzle changer" 38*g*, "conveyors" 38*h* and 38*i*, and "power supply" 38*j* are exemplified in device main portion 38, and "tape transfer path" 39*a* is exemplified in tape feeder 39.

Recommended maintenance deadline 36 is defined for the respective items of the maintenance target defined by "maintenance portion" 35*a* and "work classification" 35*b*. Recommended maintenance deadline 36 is a deadline by which execution of the maintenance work is necessary on the item of the maintenance target. Specifically, the deadline is defined by a deadline (hereinafter, referred to as a use limit time) of a date and time by which execution of the maintenance work is necessary after starting the use of the item of the maintenance target, or a deadline (hereinafter, referred to as a use limit count) of a use count of the maintenance work reaches a predetermined use limit count after starting the use of the item of the maintenance target. For example, the item of "nozzle holder" 38*a* shows "140H". This means, that it is necessary to execute the maintenance work on the item within a use time of 140 H from a point of time when the previous maintenance work is executed, that is, by the time when 140 hours as a use time in an actual operation state have elapsed. The use time (or the use count) of the maintenance target mentioned herein includes a use time (or a use count) after the use is started from an unused state, and a use time (or a use count) after the previous maintenance work is executed and the use is started.

A priority obtained by classifying a priority level at which execution of the maintenance work is necessary based on recommended maintenance deadline 36, is defined in maintenance priority 37. The classification of the priority level is performed by classifying a wide range until recommended maintenance deadline 36 into arbitrary small ranges which are set in advance. Here, an example in which the priority level is classified into three levels of A, B and C, is illustrated. For example, in the item indicated by "nozzle holder" 38*a*, levels A, B and C of maintenance priority 37 are defined in order from the high priority level at which execution of the maintenance work is necessary. The use time of 140 H to 100 H is classified for "maintenance priority A" 37*a*. The use time of 100 H to 40 H is classified for "maintenance priority B" 37*b*. The use time of 40 H or less is classified for "maintenance priority C" 37*c*. Similarly, maintenance priority 37 is determined for the other items based on the association of recommended maintenance deadline 36 with the use time or use count of the maintenance target, as shown in FIG. 6.

That is, priority table information 35 defines maintenance priority 37 that classifies the priority level at which execution of the maintenance work is necessary based on the association of recommended maintenance deadline 36 with the use count or use time of the maintenance target. As recommended maintenance deadline 36 used herein, any one of the use time indicating an elapsed operation time or the use count indicating the number of times at which the operation is executed in an operation such as a component mounting operation, is appropriately selected and is adopted.

Production performance information 40 indicates the production performance of the component mounting operation executed in component mounting system 1. Then, use time/use count 40*a* of each item indicated by maintenance target 33 can be obtained based on production performance information 40 in the present exemplary embodiment. In the present exemplary embodiment, maintenance work support apparatus 5 includes production information acquirer 51. Then, production information acquirer 51 obtains production information from management apparatus 3 of component mounting system 1 through communicator 50.

The production information includes production performance information 40 executed in component mounting system 1, and information regarding a production plan indicating a prearranged production operation executed by component mounting system 1. Execution history information 41 is information indicating the history of the maintenance work executed on each maintenance target. Similarly to production performance information 40, execution history information 41 is obtained by production information acquirer 51 from management apparatus 3 of component mounting system 1, and is used to calculate maintenance priority 37 to be described below.

Priority calculator 56 performs a processing of calculating maintenance priority 37 changed with date and time in the operation procedure of component mounting system 1 for each maintenance work indicated by maintenance target 33 based on priority table information 35 and execution history information 41 included in the above-described maintenance relevant information 31. In the calculation of maintenance priority 37, the use time or the use count from a point of time when the previous maintenance work is executed, is obtained based on execution history information 41. Then, to which maintenance priority 37 at the point of time belongs among “maintenance priority A” 37*a*, “maintenance priority B” 37*b*, and “maintenance priority C” 37*c*, is calculated by comparing the obtained use time or the obtained use count with priority table information 35.

In the calculation of maintenance priority 37, a prearranged use time or a prearranged use count of each maintenance target may be predicted from the production plan obtained by production information acquirer 51, and maintenance priority 37 may be calculated at date and time in a future after an information obtaining date based on the prearranged use time or the prearranged use count of the maintenance target and priority table information 35.

Maintenance work plan calculator 57 performs a processing of creating the work plan of the maintenance work executed on at least one among the maintenance targets based on maintenance priority 37 calculated by priority calculator 56. The created maintenance work plan is displayed on display 58. Then, an operator who executes the maintenance work, executes the work according to the displayed work plan. When the maintenance work plan is created, date and time when the maintenance work is executed are input through input 52, and are set by setting unit 53. Maintenance work plan creation unit 57 creates the maintenance work plan such that the maintenance work is executed by the set maintenance date and time. The notification that the maintenance work indicated by the created work plan is to be executed, is displayed on display 58 together with the production plan.

Hereinafter, maintenance plan data created by maintenance work plan creation unit 57 will be described. Maintenance plan data 42 is stored in storage 30, and maintenance condition data 43, maintenance priority schedule data 44 and maintenance work plan table 45 are included in maintenance plan data 42. As shown in FIG. 7, maintenance priority schedule data 44 indicates “change with date and time of maintenance priority” 44*a*, that is, a change of maintenance priority 37 calculated by priority calculator 56 for the item for each of target items 46*a* to 46*g* of individual maintenance works defined by maintenance target 33 (see FIG. 4).

Here, the results in which maintenance priority 37 in dates a1, a2, a3, . . . , a6, and a7 set as for plan references is predicted, are described as A, B and C corresponding to “maintenance priority A” 37*a* to “maintenance priority C” 37*c*. That is, maintenance priority 37 is “maintenance priority C” 37*c* immediately after the maintenance is executed. The number of days when the device is operated, has elapsed, and the use time or the use count is accumulated, and thus, maintenance priority 37 is sequentially changed to “maintenance priority B” 37*b* and “maintenance priority A” 37*a*. Based on maintenance priority schedule data 44 created in this manner, it is possible to understand the change of maintenance priority 37 of each individual maintenance work item, and it is possible to reasonably determine the priority order when medium- and long-term maintenance work plans are created.

Figure 10:
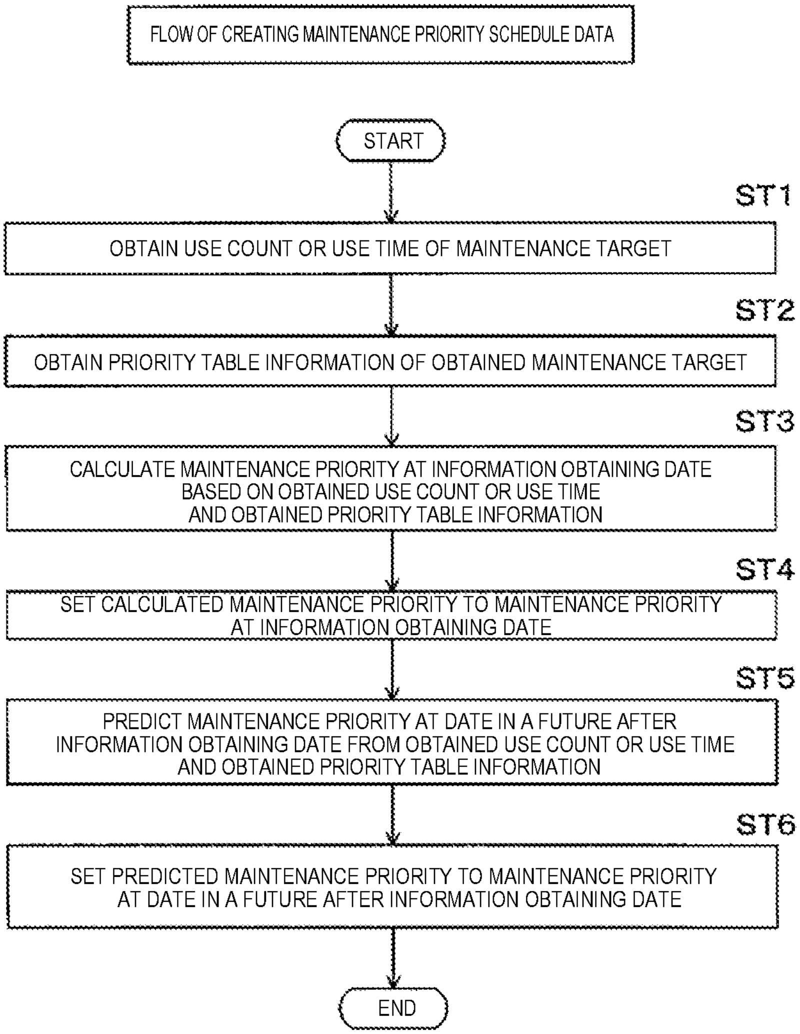
FIG. 10 shows process flows of creating the maintenance priority schedule data in the production activity support system of the exemplary embodiment of the present invention.
Figure 11:
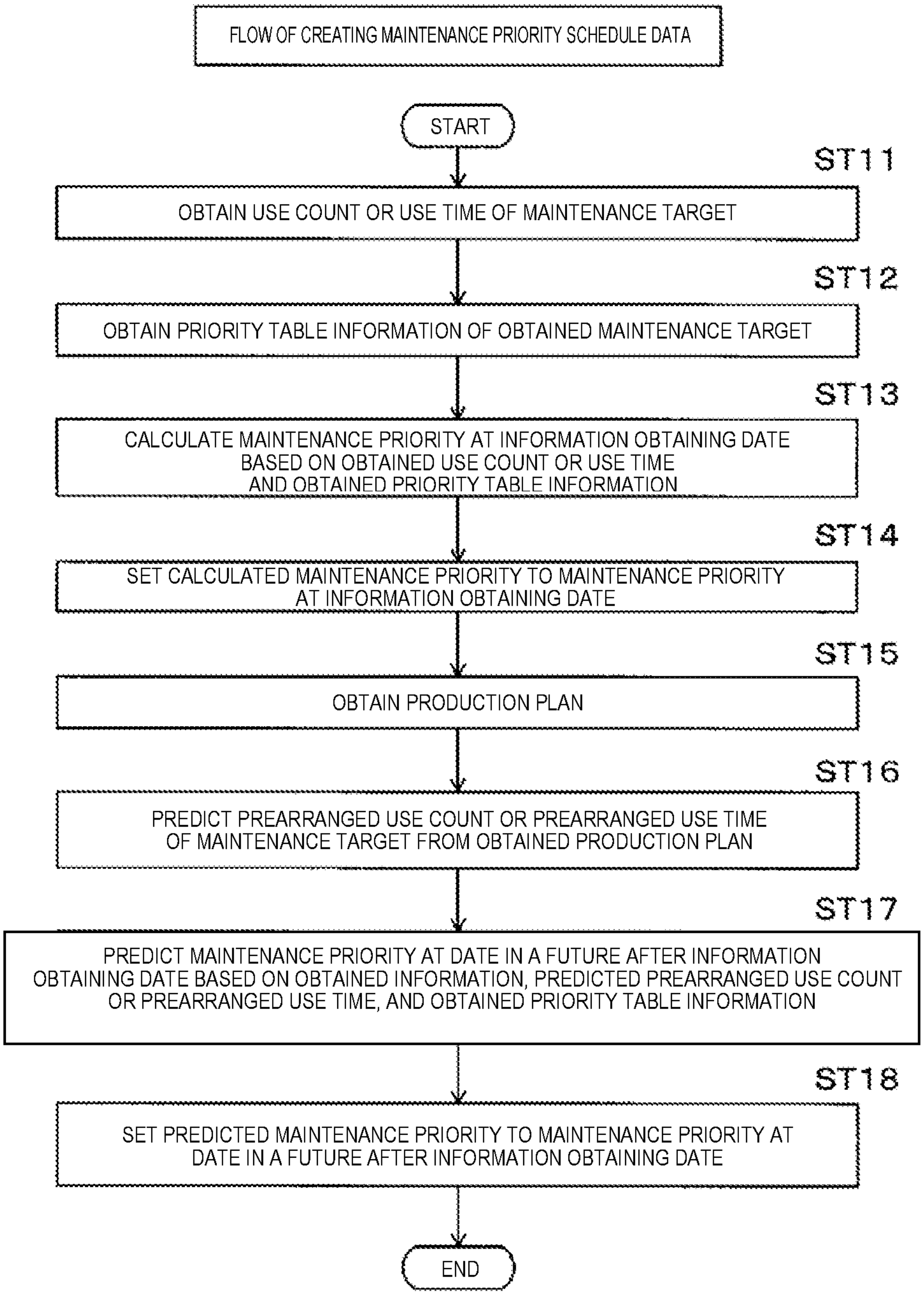
FIG. 11 shows process flows of creating the maintenance priority schedule data in the production activity support system of the exemplary embodiment of the present invention.

Hereinafter, the process flow of updating maintenance priority 37 executed when maintenance priority schedule data 44 is created, will be described with reference to FIGS. 10 and 11. These processes are performed by the functions of priority calculator 56. Firstly, a method of setting maintenance priority 37 based on the assumption that the device operation state is continued without referring to the production plan, will be described with reference to FIG. 10. First, the use count or the use time of the maintenance target as a target of the updating processes of maintenance priority 37 is obtained (ST1). That is, use time/use count 40*a* included in production performance information 40 stored as maintenance relevant information 31 in storage 30 is read. Subsequently, priority table information 35 corresponding to the obtained maintenance target is obtained (ST2). That is, priority table information 35 stored as maintenance relevant information 31 in storage 30 is similarly r) ead.

Maintenance priority 37 at an information obtaining date is calculated based on the obtained use count or the obtained use time and obtained priority table information 35 (ST3). Calculated maintenance priority 37 is set as maintenance priority 37 at the information obtaining date (ST4). Subsequently, maintenance priority 37 at the date in a future after the information obtaining date, is predicted from the obtained use count or the obtained use time and obtained priority table information 35 (ST5). Here, the use count or the use time is estimated and is predicted based on the performance of the device operation state until this point of time, and maintenance priority 37 at the date (for example, dates al to a7 in maintenance priority schedule data 44 shown in FIG. 7) in a future after the information obtaining date, is predicted based on the predicted result (the predicted use count or the use time). Predicted maintenance priority 37 is set as maintenance priority 37 at the date in a future after the information obtaining date (ST6).

The performance of the device operation state until this point of time is, for example, the use count or the use time of each maintenance target facility during a predetermined period such as one day or one week, or an average value based on the use count or the use time. The setting of maintenance priority 37 means updating in a case where maintenance priority 37 of the maintenance target is calculated in the past. The calculation of maintenance priority 37 at the date in a future after the information obtaining date may be performed for a predetermined period such as one week or one month, or for a period that can be calculated within a range that does not exceed recommended maintenance deadline 36. Maintenance priority schedule data 44 shown in FIG. 7 is created by setting the date and time of the target to calculated maintenance priority 37 and predicted maintenance priority 37.

Hereinafter, a method of setting maintenance priority 37 based on the prearranged device operation state on the production plan by referring to the production plan obtained by production information acquirer 51, will be described with reference to FIG. 11. Here, ST11 to ST14 are the same flows as ST1 to ST4, and thus, the description will be omitted. Thereafter, the production plan in component mounting system 1 is obtained by production information acquirer 51 (ST15). Subsequently, the prearranged use count or the prearranged use time of the maintenance target is predicted from the obtained production plan (ST16). The prearranged use count or the prearranged use time of the maintenance target including at least one of facility information to be used, and the number of mounting boards to be produced, may be predicted from the obtained production plan, or the prearranged use count or the prearranged use time may be predicted through simulation.

Subsequently, maintenance priority 37 at the date in a future after the information obtaining date, is predicted based on the obtained information, the predicted prearranged use count or the predicted prearranged use time, and obtained priority table information 35 (ST 17). Maintenance priority 37 at the date in a future after the information obtaining date, is set based on predicted maintenance priority 37 (ST18).

Maintenance priority schedule data 44 shown in FIG. 7 is created by setting the date and time of the target to calculated maintenance priority 37 and predicted maintenance priority 37. As stated above, in the calculation of maintenance priority 37, it is possible to more accurately predict maintenance priority 37 of the maintenance target by referring to the production plan, and it is possible to improve the accuracy of the schedule planning.

Hereinafter, a processing of creating maintenance work plan table 45 shown in FIG. 9, will be descried with reference to FIGS. 8 and 12, based on predefined maintenance condition data 43 and maintenance priority schedule data 44 created in this manner. Maintenance condition data 43 shown in FIG. 8 defines a condition allowed to execute the maintenance work in component mounting system 1. Maintenance condition data 43 may be previously set by a manager who manages the production facilities including the component mounting system. Otherwise, Maintenance condition data 43 may be created by obtaining the operator and the time when the operator can execute the maintenance work, from a system including operator information of ERP and time information at which the operator can execute the maintenance work through management apparatus 3. In the following description, a series of flows of creating the maintenance work plan by obtaining the operator information and the time when the operation can execute the maintenance work from management apparatus 3, will be described.

That is, in Pattern 1 shown in FIG. 8A, operators 43*a* (here, three people of OO, OX and XX) who can execute the maintenance work in component mounting system 1, and "work time" 43*b* that each of these operators can spend in order to execute the maintenance work, are previously defined. Here, all the operators of OO, OX, and XX can spend 60 minutes executing the maintenance work. In Pattern 2 shown in FIG. 8B, component mounting lines L1 and L2 as operating target facilities 43*c* to which the respective operators of operators 43*a* can be assigned, are defined. Here, the operators of OO and XX can be assigned to component mounting line L1, and the operator of OX can be assigned to component mounting line L2.

Figure 12:
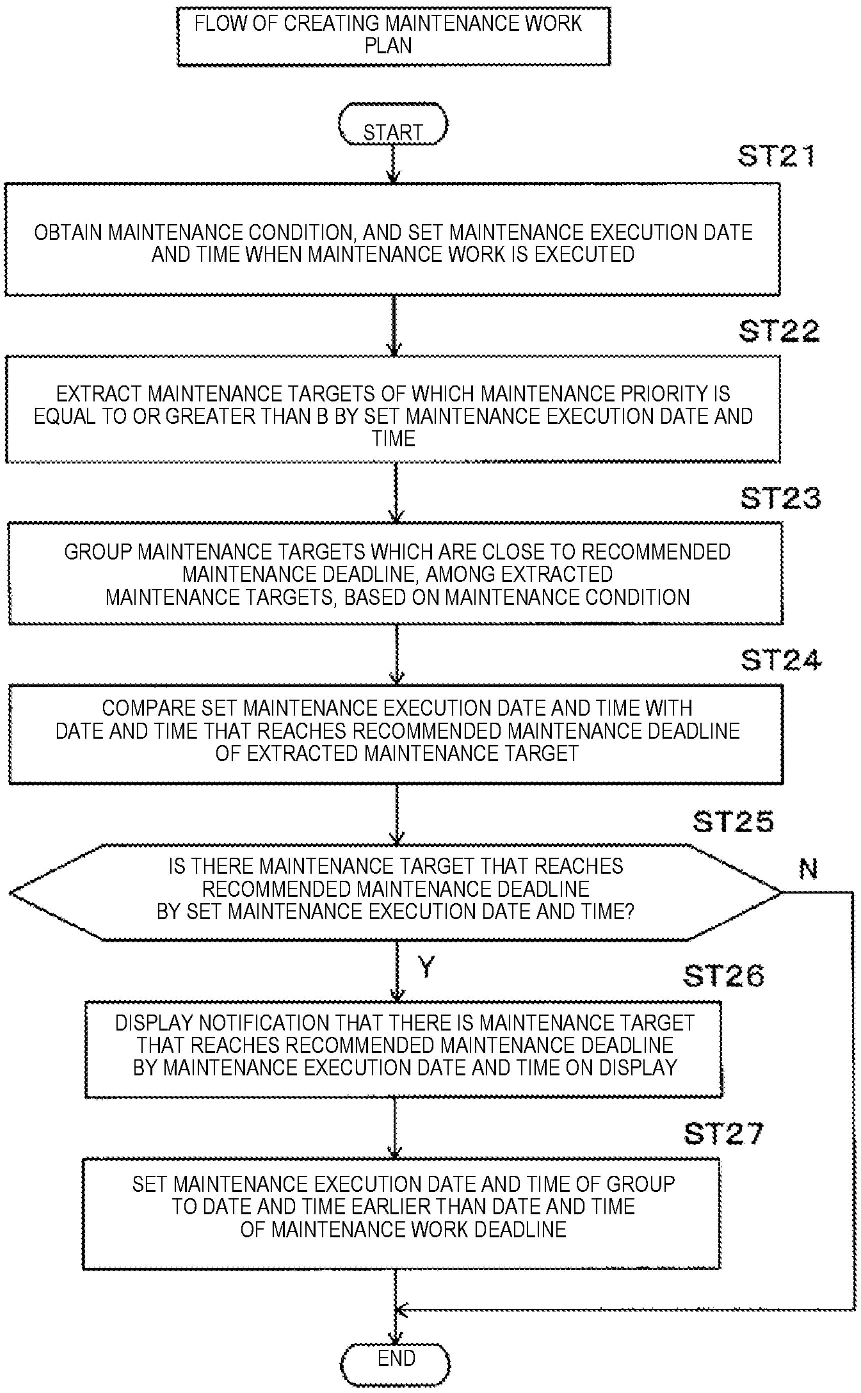
FIG. 12 shows process flows of creating a maintenance work plan in the production activity support system of the exemplary embodiment of the present invention.

In FIG. 12, under the condition of maintenance condition data 43 described above, a flow of creating the maintenance work plan based on the maintenance priority arranged in maintenance priority schedule data 44 in a schedule form, will be explained in the following. Initially, the maintenance execution date and time when the maintenance work is executed, is set by setting unit 53 by obtaining maintenance condition data 43 (ST21). That is, setting unit 53 sets the prearranged maintenance execution date and time when maintenance work is executed.

Thereafter, the maintenance target of which maintenance priority 37 is equal to or greater than maintenance priority B, is extracted from maintenance priority schedule data 44 by extractor 54, by the set maintenance execution date and time (ST22). That is, extractor 54 extracts the maintenance target, of which it is determined that maintenance priority 37 at the set maintenance execution date and time is higher than a predetermined classification (here, maintenance priority B) in which it is determined that an execution of the maintenance is desirable, from maintenance priority schedule data 44.

Subsequently, the maintenance targets, among the extracted maintenance targets, which are close to recommended maintenance deadline 36 are grouped, based on the predefined maintenance condition (ST23). This grouping processing is performed by maintenance work plan creation unit 57. That is, maintenance work plan creation unit 57 creates the work plan such that the maintenance targets, among the extracted maintenance targets, which are close to recommended maintenance deadline 36, that is, of which the use counts or the use times are close to the use limit time or the use limit count, are maintained in order from the target close to the use limit time or the use limit count.

Here, the work time is initially considered as the maintenance condition, and in a case where one operator executes the maintenance work, a state in which the total necessary work time does not exceed 60 minutes, becomes a condition capable of combining a plurality of maintenance targets as one group, as shown in FIG. 8. In a case where total work time of the maintenance targets exceeds the work time of the operator, the notification for allowing the operator to determine whether or not the corresponding maintenance target is brought to the next maintenance work based on maintenance priority 37, or whether or not it is necessary to reset the maintenance condition, is displayed on display 58. Accordingly, it is possible to easily determine to add resources (maintenance operator or maintenance time) required for the maintenance work in order for the operator to give priority to the production or the maintenance.

Thereafter, it is determined whether or not there is the maintenance target, among the extracted maintenance targets, which reaches recommended maintenance deadline 36 earlier than the set maintenance execution date and time (ST24). That is, comparator 55 compares the set maintenance execution date and time with the date and time that reach the recommended maintenance deadline of the extracted maintenance target. It is determined whether or not there is the maintenance target that reaches the recommended maintenance deadline by the set maintenance execution date and time (ST25).

Here, in a case where there is the maintenance target that reaches the recommended maintenance deadline by the set maintenance execution date and time, the notification that there is the maintenance target that reaches the recommended maintenance deadline by the maintenance execution date and time, is displayed on display 58 (ST26). After the notification is displayed on display 58, the maintenance execution date and time of the group is set to date and time (for example, the previous date before the day that reaches the recommended maintenance deadline) earlier than the date and time that reach the recommended maintenance deadline (ST27). That is, the maintenance execution date and time set in (ST21) are advanced, and the maintenance execution date and time are reset, such that the maintenance date and time when the maintenance work is executed in actuality become date and time earlier than the date and time that reach the recommended maintenance deadline. If the maintenance execution date and time are set, the flow of the maintenance work plan is ended.

That is, as the comparison result of comparator 55, in a case (N of ST25) where there is no maintenance work plan including the maintenance target that reaches the recommended maintenance deadline by the set maintenance execution date and time, maintenance work plan creation unit 57 creates the maintenance work plan at the maintenance execution date and time on the work plan. Accordingly, maintenance work plan table 45 shown in FIG. 9 is created. In the example shown in FIG. 9, six items among seven items of target item 46*a* to target item 46*g* listed up in maintenance priority schedule data 44 shown in FIG. 7 are grouped into three groups (groups 45(1), 45(2) and 45(3)), and the work plan for executing the maintenance work is drafted.

Here, in group 45(1) with date a2 indicated by maintenance priority schedule data 44 as the maintenance execution date and time, the maintenance work is executed using target items 46*a* and 46*f* in FIG. 7 as maintenance targets 33. In this case, the grouping is performed such that the total (necessary time) of "work times" 45*a* of the respective items given by maintenance work content 34 shown in FIG. 5 does not exceed "work time" 43*b* (allowable time) given by maintenance condition data 43 shown in FIG. 8, and executability in the producing site (for example, a factory) is guaranteed.

In group 45(2) and group 45(3) with date a3 indicated by maintenance priority schedule data 44 as the maintenance execution date and time, the maintenance work is executed using target items 46*g*, 46*b* and 46*c* and target item 46*e* in FIG. 7 as maintenance targets 33. In this case, the grouping is similarly performed such that maintenance work time 45*b* indicating the total (necessary time) of "work times" 45*a* of the respective items given by maintenance work content 34 shown in FIG. 5 does not exceed "work time" 43*b* (allowable time) given by maintenance condition data 43 shown in FIG. 8.

As mentioned above, it is possible to reduce the number of times the device operation is stopped in order to execute the maintenance work to the utmost by grouping the plurality of maintenance targets based on the predefined maintenance condition. Accordingly, it is possible to reduce degradation in productivity caused by stopping the device in order to execute the maintenance work to the utmost, which occurs with high frequency whenever the facilities or units constituting component mounting system 1 individually meet the maintenance period in the related art. In the above-described example, it has been described that maintenance condition data 43 is obtained from the system including the operator information and the time when the operator can execute the maintenance work and the maintenance work plan is created, but the operator may input a part of maintenance condition data 43 and may create the maintenance work plan. That is, the operator determines the maintenance condition from the production plan, and creates the maintenance work plan such that the maintenance work can be executed in a time zone when the component mounting lines are not operated.

Figure 13A:
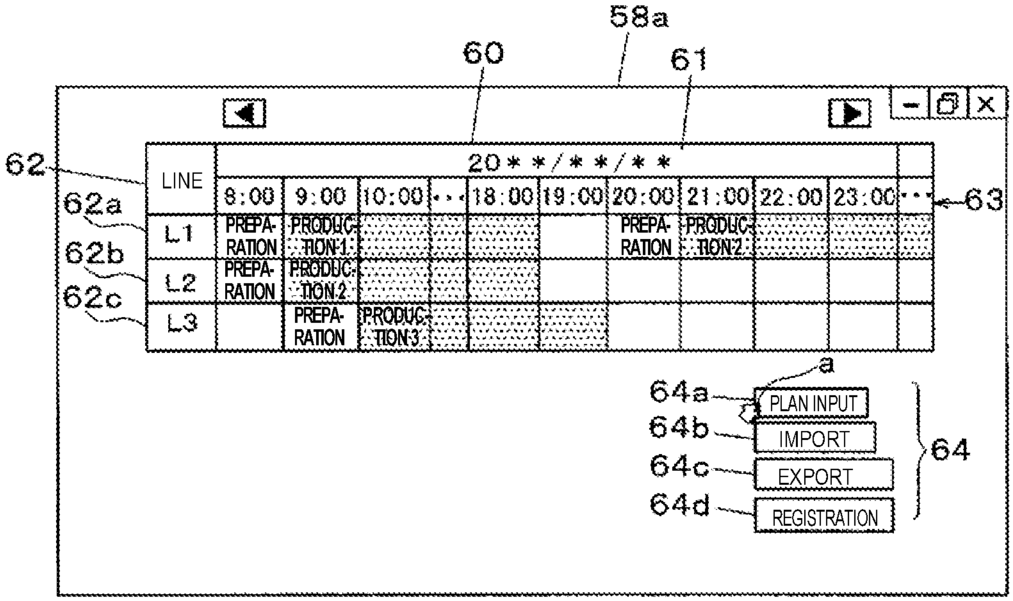
FIG. 13A and FIG. 13B are diagrams showing a display screen when the maintenance plan is created in the production activity support system of the exemplary embodiment of the present invention.
Figure 14A:
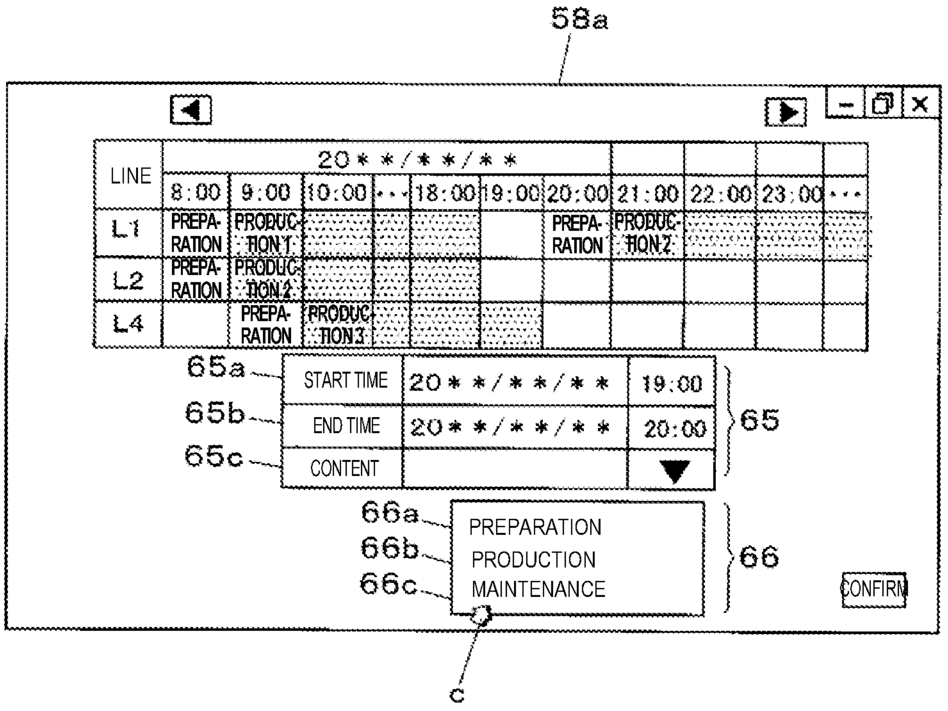
FIG. 14A and FIG. 14B are diagrams showing the display screen when the maintenance plan is created in the production activity support system of the exemplary embodiment of the present invention.
Figure 14B:
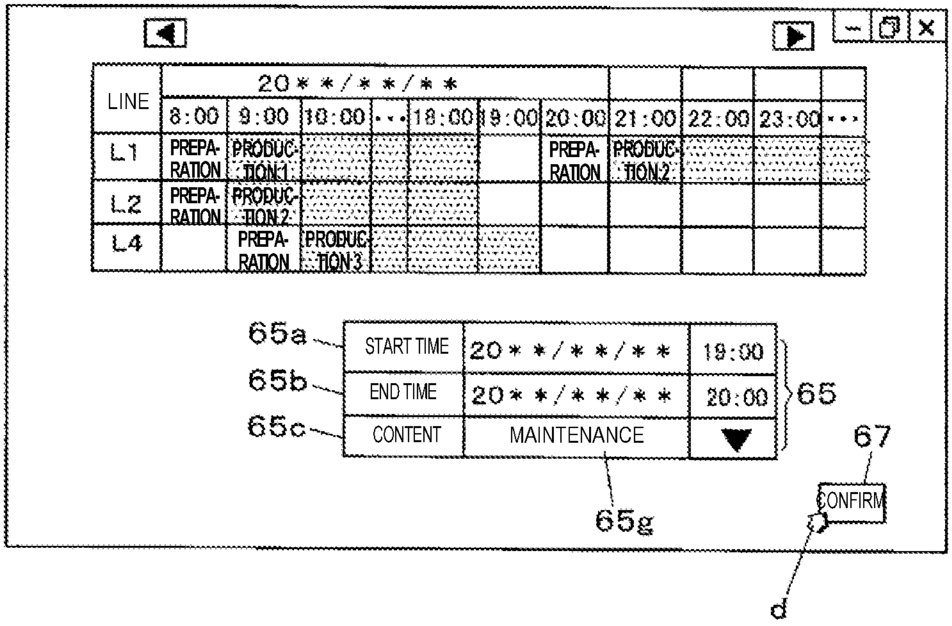
Figure 15:
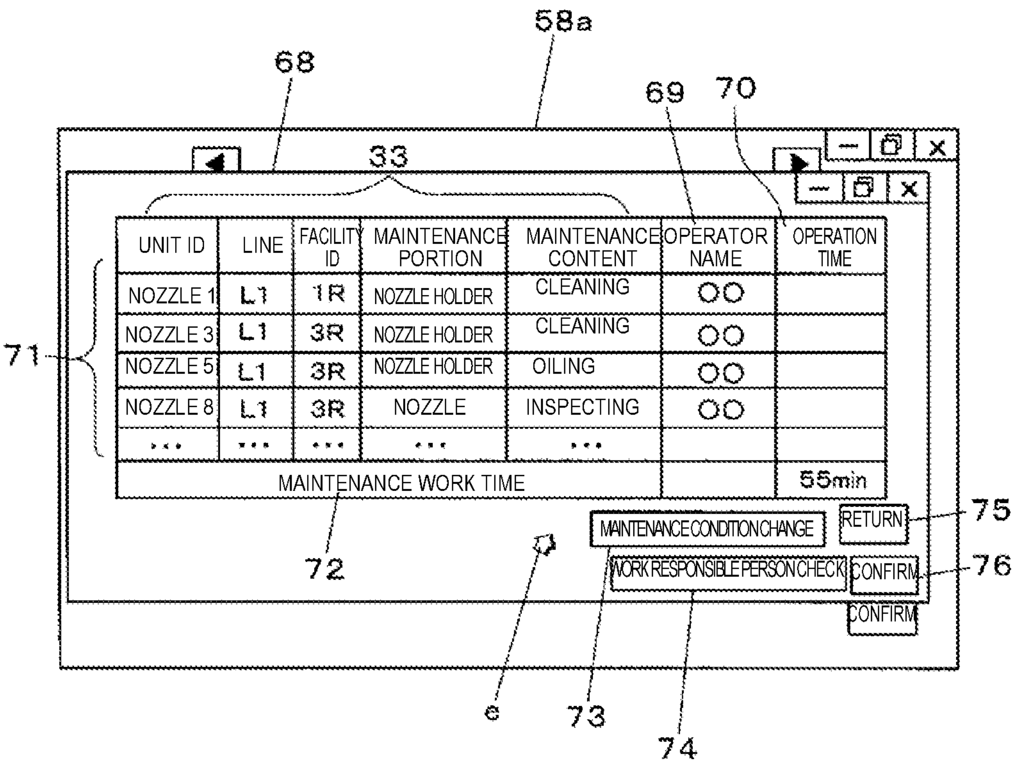
FIG. 15 is a diagram showing the display screen when the maintenance plan is created in the production activity support system of the exemplary embodiment of the present invention.

Hereinafter, a series of flows of creating the maintenance work plan through the inputting of maintenance condition data 43 by the operator, will be described with reference to FIGS. 13 to 15. Initially, FIG. 13A shows a state in which plan display frame 60 and operation button 64 are displayed on display screen 58*a* of display 58. Plan display frame 60 displays the execution timetable and the classification of the operation executed in the plurality of component mounting lines as the targets. That is, date field 61 indicating the execution date, and line classification field 62 (here, "L1" 62*a*, "L2" 62*b* and "L3" 62*c* corresponding to lines L1, L2 and L3) indicating the classification of the component mounting line are displayed on plan display frame 60. Date field 61 is classified for each time zone by time zone display field 63, and the display and input of the maintenance work can be done on the displayed time zones.

"Plan input" 64*a*, "import" 64*b*, "export" 64*c*, and "registration" 64*d* are provided as operation button 64. These buttons are operated by operating a pointer (arrow a) displayed on the screen, and thus, the operation input corresponding to each button is performed. "Plan input" 64*a* is a button for inputting the maintenance work plan. "Import" 64*b* is a button for importing information regarding a maintenance work plan created in advance, and information regarding an operation support system or ERP other than the component mounting system into the maintenance work support apparatus. It is possible to obtain the information regarding the operation support system other than the component mounting system or the production plan by "import" 64*b*, and it is possible to use the information in order to create the maintenance work plan.

"Export" 64*c* is a button for exporting information regarding the created maintenance work plan to a higher system such as ERP or another maintenance work support apparatus. Another maintenance work support apparatus 5 or another management apparatus 3 obtains the information regarding the maintenance work plan created by "export" 64*c*, and thus, it is possible to use the information in order to create the maintenance work plan of the entire production floor. "Registration" 64*d* is a button for registering the created maintenance work plan table.

Figure 13B:
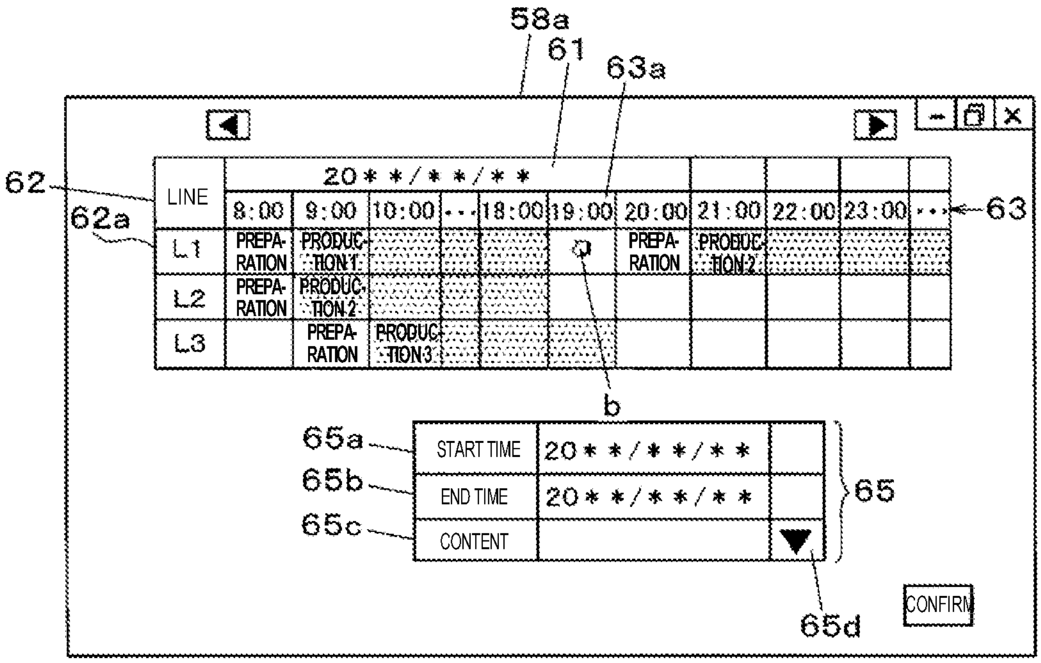

Here, as an example, the pointer (arrow a) is operated in a state where the pointer (arrow a) is pointed at "plan input" 64*a* as an initial operation. Through this operation, the screen shown in FIG. 13B is displayed on display screen 58*a*. Setting operation field 65 provided with setting fields for setting "start time" 65*a* and "end time" 65*b* of the maintenance work to be executed and "content" 65*c* of the maintenance work, is displayed on this screen. On this screen, a pointer (arrow b) is operated in a state where the pointer (arrow b) indicates "L1" 62*a* indicating line L1 as the target in line classification field 62, target time zone 63*a* (here, 19:00 to 20:00) intended to execute the operation, and selection display operation button 65*d* provided in setting operation field 65. Then, the screen shown in FIG. 14A is displayed on display screen 58*a*

On this screen, 19:00 as "start time" 65*a* and 20:00 as "end time" 65*b* are input and are displayed so as to correspond to the maintenance work content, and selection branch field 66 indicating the selection content in "content" 65*c* is displayed. Here, "preparation" 66*a*, "production" 66*b*, and "maintenance" 66*c* are provided in selection branch field 66. "Maintenance" 66*c* is operated with a pointer (arrow c), and thus, the confirmation screen shown in FIG. 14B is displayed on display screen 58*a*. Accordingly, "maintenance" 65*g* is displayed on "content" 65*c* in "setting operation field" 65.

The work responsible person checks the screen display, and operates "confirm button" 67 with a pointer (arrow d). Thus, the screen display of the maintenance work plan execution is confirmed. That is, the maintenance execution date and time and the allowable time of work time 70 are set. The operator is set by obtaining the operator at the input maintenance execution date and time from the system including the operator information and the time information at which the operator can execute the maintenance work.

Accordingly, the process flow (flow subsequent to ST22) of creating the above-described maintenance work plan is performed. After the process flow of creating the maintenance work plan is performed, in a case where the maintenance plan is created, maintenance plan operation table 68 shown in FIG. 15 is displayed on display screen 58*a*. Maintenance target 33 shown in FIG. 4, "operator name" 69 who executes the operation, and "work time" 70 indicating the time required for the work, are displayed on maintenance plan operation table 68 for each "target item" 71 indicating the target item of maintenance target 33. "Maintenance work time" 72 obtained by summing "work times" 70 is displayed for checking. The process flow of updating the priority may be performed, before process flow ST22 of creating the maintenance work plan is performed. The process flow of updating the priority is performed before process flow ST22 of creating the maintenance work plan, and thus, latest maintenance priority 37 can be extracted. Thus, it is possible to understand a change of maintenance priority 37 for each individual maintenance work time, and it is possible to create medium- and long-term maintenance work plans.

In addition, "maintenance condition change" 73 and "work responsible person check" 74 are set to display screen 58*a*. These items are operated with a pointer (arrow e), and thus, the maintenance condition is changed and the work responsible person is checked. "Return" 75 and "confirm" 76 are operated, and thus, an operation of returning the setting to the original state or an operation of confirming the setting is performed.

That is, in the maintenance work support system, the production activity support system having the above-described configuration, the notification that the maintenance work indicated by the maintenance work plan (see maintenance work plan table 45 shown in FIG. 9) created by maintenance work plan creation unit 57 is to be executed, is displayed on display 58 at the maintenance execution date and time set by setting unit 53 along with the production plan of component mounting system 1. Accordingly, it is possible to efficiently execute a maintenance work required to maintain production efficiency, by effectively using spare time during which the maintenance work can be executed, such as an idle time generated in a procedure during which various operations such as production, preparation are carried out in component mounting system 1.

As described above, when the maintenance work executed on the maintenance target in component mounting system 1 is supported, the maintenance work support system according to the present exemplary embodiment, stores in storage 30, maintenance relevant information 31 including: recommended maintenance deadline 36 indicating the deadline by which execution of the maintenance work is necessary; priority table information 35 for defining maintenance priority 37 which classifies the priority level at which execution of the maintenance work is necessary based on the association of recommended maintenance deadline 36 with the use time or use count of the maintenance target; and execution history information 41 indicating the history of the maintenance work executed on each of the maintenance targets. Then, the maintenance work support system calculates maintenance priority 37 changed with date and time for each of the maintenance works based on execution history information 41 and priority table information 35 included in maintenance relevant information 31 by means of priority calculator 56, and creates the work plan of the maintenance work executed on at least one of the maintenance targets based on maintenance priority 37 calculated by priority calculator 56 by means of maintenance work plan creation unit 57. Accordingly, it is possible to execute the efficient maintenance work from medium- and long-term points of view in the component mounting system.

In the production activity support system according to the present exemplary embodiment, when the production activity including the maintenance work executed on the maintenance target in component mounting system 1 is supported, the production information including production performance information 40 and the production plan of the production operation executed in component mounting system 1, is obtained by production information acquirer 51. Then, the production activity support system stores in storage 30, maintenance relevant information 31 regarding one or more maintenance works executed on each of the maintenance targets, which includes recommended maintenance deadline 36 indicating the deadline by which execution of the maintenance work is necessary, and execution history information 41 indicating the history of the maintenance work executed on each of the maintenance targets. Then, the production activity support system creates the operation plan of the maintenance work executed on at least one of the maintenance targets though maintenance work plan creation unit 57, and displays on display 58 along with the production plan, the notification that the maintenance work indicated by the work plan created by maintenance work plan creation unit 57 at the maintenance execution date and time set by setting unit 53 is to be executed. Accordingly, it is possible to easily create the maintenance work plan and notify the operator of the created maintenance work plan, and it is possible to execute the efficient maintenance work with excellent operability from medium- and long-term points of view in the component mounting system.

The exemplary embodiment of the present invention has been described. It should be understood by those skilled in the art that the exemplary embodiment can be modified in various forms by combining the respective elements or processing processes, and the modification examples are included in the scope of the present invention.

For example, it has been described that component mounting system 1 is a maintenance application target, but a maintenance target removed from component mounting system 1 may be a maintenance application target. The maintenance target removed from component mounting system 1 refers to, for example, tape feeder 15, mount head 19 or nozzle 20. The maintenance target removed from component mounting system 1 is also included in the maintenance application target, and thus, the maintenance work is executed on the removed maintenance target used in a prearranged production operation executed on the production plan before this maintenance target reaches the use limit time or use limit count. Thus, it is possible to efficiently execute the maintenance work.

The production activity support system of the present invention has an effect of executing an efficient production activity from medium- and long-term points of view in the component mounting system, and is useful in the field in which mounting boards are produced by mounting electronic components on boards.

What is claimed is:

1. A component mounting system including at least one component mounting device connected to a production activity support system via a communication network, the at least one component mounting device comprising:

a plurality of maintenance targets, wherein the plurality of maintenance targets includes at least one of a conveyor, nozzle holder, nozzle, tape feeder, and power supply; and a controller, wherein the at least one component mounting device executes a component mounting operation, and wherein the controller transmits production performance information obtained during the executed component mounting operation, including use count and/or use time of the plurality of maintenance targets, from the component mounting device to the production activity support system; and the production activity support system comprising:

a production information acquirer, wherein the production information acquirer obtains production information of the at least one component mounting device, the production information including the production performance information and a production plan for the component mounting system and wherein a predicted use count and/or predicted use time of the plurality of maintenance targets is predicted from the obtained production plan;

a priority calculator, wherein the priority calculator predicts a maintenance priority for the plurality of maintenance targets based on the predicted use count and/or use time;

storage, wherein the storage stores maintenance relevant information including a recommended maintenance deadline and execution history information indicating a history of the maintenance work executed on each of the maintenance targets;

a maintenance work plan creation unit, wherein the maintenance work plan creation unit creates a work plan of the maintenance work to be executed on at least one of the plurality of maintenance targets;

a setting unit, wherein the setting unit sets a date and time for executing the maintenance work;

a comparator, wherein the comparator compares the set maintenance execution date and time with the recommended maintenance deadline, wherein, when one of the plurality of maintenance targets reaches the recommended maintenance deadline earlier than the set maintenance execution date and time, the maintenance execution date and time of the work plan is updated to be earlier than the recommended maintenance deadline; and a display that displays to an operator the updated work plan.

2. The system according to claim 1, wherein the maintenance relevant information includes priority table information that defines the maintenance priority, wherein the maintenance priority is classified as a priority level at which execution of the maintenance work is necessary, based on an association of the recommended maintenance deadline with a use time or a use count of the plurality of maintenance targets, and the production activity support system further comprising:

wherein the priority calculator calculates an updated maintenance priority changed with date and time based on the execution history information and the priority table information included in the maintenance relevant information; and an extractor, wherein the extractor extracts the plurality of maintenance targets of which the maintenance priority at the set maintenance execution date and time is determined to be higher than the predetermined priority level, and the maintenance work plan creation unit creates the work plan of the maintenance work executed on at least one of the maintenance targets, based on the updated maintenance priority calculated by the priority calculator.

3. The system according to claim 2, wherein the display displays the work plan of the maintenance work created by the maintenance work plan creation unit.

4. The system according to claim 2, wherein the production information obtained by the production information acquirer includes production performance information for the component mounting system, and wherein the priority calculator calculates the maintenance priority, based on the obtained production performance information, the execution history information, and the priority table information.

5. The system according to claim 3, wherein the production information obtained by the production information acquirer includes production performance information for the component mounting system, and wherein the priority calculator calculates the maintenance priority, based on the obtained production performance information, the execution history information, and the priority table information.

6. The system according to claim 3, wherein the priority calculator predicts a use time or use count for each of the maintenance targets from the production plan and calculates the maintenance priority at a future date based on the predicted use time or use count of each of the maintenance targets and the priority table information.

7. The system according to claim 2, wherein the maintenance work plan creation unit creates the work plan for the extracted maintenance targets that are close to the recommended maintenance deadline in order from the extracted maintenance target that is closest to the recommended maintenance deadline to the extracted maintenance target that is farthest from the recommended maintenance deadline.

8. The system according to claim 3, wherein the maintenance work plan creation unit creates the work plan for the extracted maintenance targets that are close to the recommended maintenance deadline in order from the extracted maintenance target that is closest to the recommended maintenance deadline to the extracted maintenance target that is farthest from the recommended maintenance deadline.

9. The system according to claim 4, wherein the maintenance work plan creation unit creates the work plan for the extracted maintenance targets that are close to the recommended maintenance deadline in order from the extracted maintenance target that is closest to the recommended maintenance deadline to the extracted maintenance target that is farthest from the recommended maintenance deadline.

10. The system according to claim 5, wherein the maintenance work plan creation unit creates the work plan for the extracted maintenance targets that are close to the recommended maintenance deadline in order from the extracted maintenance target that is closest to the recommended maintenance deadline to the extracted maintenance target that is farthest from the recommended maintenance deadline.

11. The system according to claim 1, wherein the display includes displays maintenance priority schedule data including each change with date and time.

* * * * *